INVENTOR.
Fred Mast

June 26, 1962  F. MAST  3,041,395
BAR SYSTEM IN SCHLIEREN-OPTICAL SYSTEMS
Filed Feb. 16, 1959  3 Sheets-Sheet 2

INVENTOR.
Fred Mast
BY
Pierce, Scheffler & Parker
Attorneys

June 26, 1962 F. MAST 3,041,395
BAR SYSTEM IN SCHLIEREN-OPTICAL SYSTEMS
Filed Feb. 16, 1959 3 Sheets-Sheet 3
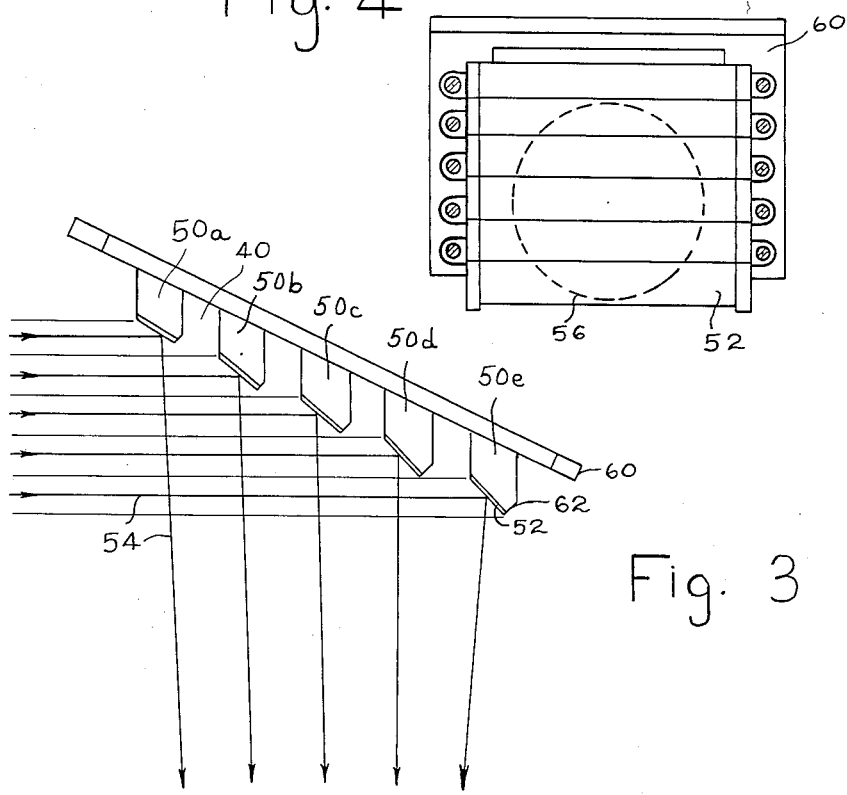
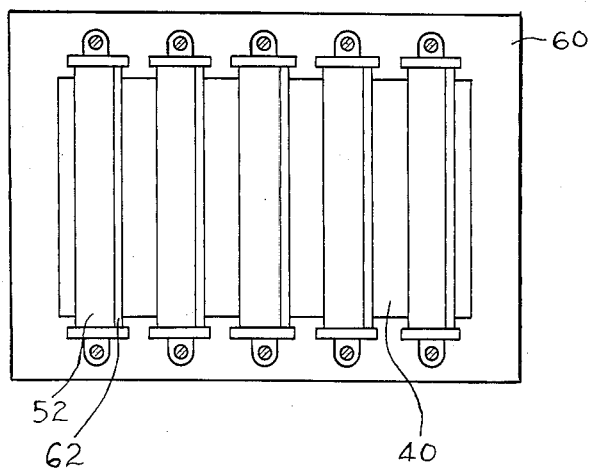
INVENTOR.
Fred Mast
BY
Pierce Scheffler & Parker
Attorneys

United States Patent Office 3,041,395
Patented June 26, 1962

3,041,395
BAR SYSTEM IN SCHLIEREN-OPTICAL SYSTEMS
Fred Mast, Zurich, Switzerland, assignor to Gretag Aktiengesellschaft, Zurich, Switzerland, a Swiss company
Filed Feb. 16, 1959, Ser. No. 793,521
Claims priority, application Switzerland Feb. 25, 1958
8 Claims. (Cl. 178—7.88)

The present invention relates to a bar system in "schlieren"-optical systems particularly schlieren-optical light modulation systems.

Light-modulating schlieren-optical systems are used inter alia for the projection of television pictures on to large area screens and have already been described, for example in U.S. Patent No. 2,644,938, dated July 7, 1953, to Hetzel et al. In these systems a light modulating film or layer is located in the image plane of a schlieren-optical system which includes a plurality of adjacent bars with mirror faces on one side, hereinafter referred to as a bar system, and a concave spherical reflector which carries the light modulating film. Bar system and reflector are so disposed that the reflector will produce images of the bars on the bars themselves. A powerful light source illuminates the picture field on the modulation film via the mirror faces of the bars. The surface of the modulation film in the picture field is subjected to varying degrees of deformation according to the distribution of brightness in the picture. These deformations constitute an uniformly spaced raster or diffraction grating the amplitude (degree of deformation) of which is different points of the picture. When the surface of the modulation film is undeformed the light rays are reflected back to the light source as the reflector reproduces images of the bars on the bars themselves. However, when the surface of the modulation film is deformed at individual picture points the light reflected at these points is sufficiently deflected to pass through the gaps in the bar system to be projected on to a screen by a projection objective.

In previously known devices of the afore described kind approximately only one half of the beam emitted by the light source is actually utilized for projecting the picture. This 50% loss is due to the employment of a bar system with coplanar mirror faces. That part of the light from the light source which is directed towards the gaps between the bars of the bar system can pass through these gaps without being reflected on to the picture field. This part of the illuminating light is thus lost.

It is the object of the present invention to improve the optical efficiency of the system. The invention concerns a bar system for schlieren-optical systems, particularly for use in conjunction with a medium which modulates the light, and consists in that the mirror faces of the bars which reflect the light from the illuminating source on to the modulation medium are disposed in different planes in such a way that were the mirror faces to be viewed from the light source, the distances between said faces would appear to be less than the distance across each face, whereas were the mirror faces to be viewed from the modulatable medium in the picture field represented by the surface of the modulation medium, the gaps between the faces would appear to be approximately of the same width as the faces. This is accomplished by a progressive set back of the faces of the bars from the plane in which is located the face of the endmost bar closest to the light source. It is preferred that if viewed from the light source the mirror faces of the bars should appear to form an ungapped surface.

The invention will now be described in greater detail with reference to embodiments thereof illustrated in the accompanying drawings, in which FIG. 1 shows a bar system according to the invention used in a light modulating system comprising a spherical concave reflector.

FIGS. 3, 4 and 5 show a bar system according to the invention shown in section and views thereof when seen in two different directions.

Figure 1:
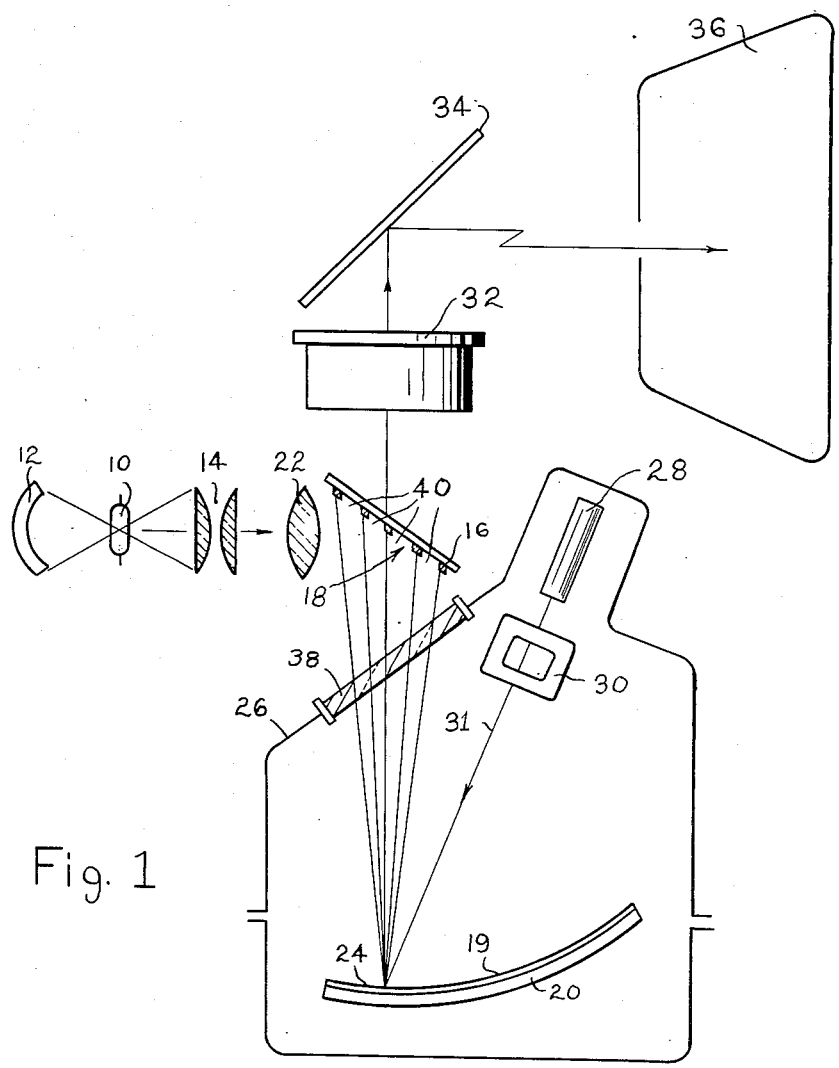
Figure 2:
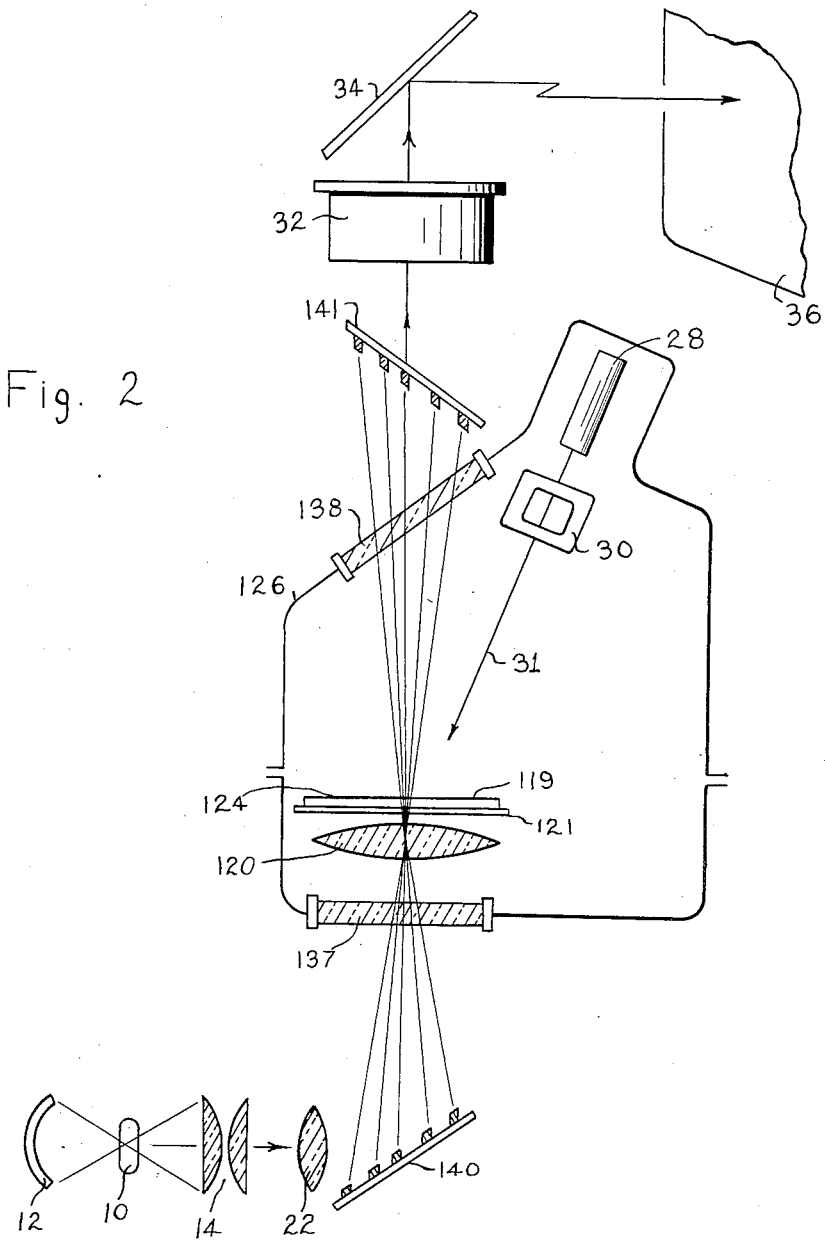
FIG. 2 is a light modulating system comprising two bar systems.

FIG. 1 schematically illustrates the principle of application of a bar system according to the invention in conjunction with a schlieren-optical system of a kind that has already been proposed. In the illustrated arrangement a concave spherical mirror produces images of the several mirror-faced bars on the bars themselves so that a single bar system serves as an entry and an exit system. The illuminating source is a gas discharge lamp 10 with a collecting reflector 12 behind the lamp and a condensing lens 14 in front of the lamp. The light falls on the mirror faces 16 of the bars of the mirror-faced bar system 18 and is reflected thereby on to the modulation medium 19 which forms a thin coating film on the surface of a spherical concave reflector 20. A lens 22 approximately focusses the plane defined by condenser 14 on the surface of the modulation film 19 which represents the television picture field 24. The illustrated arrangement serves for projecting television pictures on to a large sized screen. To this end the concave reflector 20 is contained inside an evacuated envelope 26 which also contains an electron gun 28 and a beam deflecting system 30. The electron beam sweeps the picture field 24 in adjacent lines in a manner that is well understood. In conventional manner the electron beam 31 is modulated by the video signal and produces, on the surface of the modulation film, a distribution of charges forming along the lines a uniformly spaced diffraction grating, but the grating amplitudes at different picture points are arranged to vary in accordance with the brightness distribution in the picture which it is intended to project. The bar system 18 is located in the centre of curvature of the spherical reflector 20 in such a way that the reflector will produce an image of each bar on a bar. Consequently, when the modulation film is in a state of rest, that is to say when its surface is not deformed, the light emitted by the illuminating source and reflected by the mirror faces of the bars on to the spherical reflector will be returned by the reflector via the same mirror faces to the source. However, if the surface of the modulation film in the picture field should be deformed, then the light rays deflected at each picture point will be deflected according to the degree of deformation (=amplitude of the grating) of the modulation surface at this point. This deflected light will then partly miss the mirror faces of the bars 18 and pass between them through the gaps so that it can be focussed by a projection objective 32 via a mirror 34 on to the projection screen 36 (shown on a reduced scale in the drawing). The projection objective 32 is so placed that it will produce an image of the picture field 24 on the screen 36. A plano-parallel glass plate 38 which is preferably inclined in relation to the optic axis to avoid interference by reflexes, tightly seals the evacuated envelope 26 on the side facing the system of bars 18. Additional equipment generally included in the apparatus for rotating and cooling the reflector, for renewing the material of the modulation film, and so forth, is not specially shown for the sake of greater clarity. This equipment has already been described elsewhere and is not relevant to the present invention.

According to the invention the mirror faces 16 of the bars are not as heretofore coplanar. The planes defined by the several mirror faces are relatively staggered and so disposed that if viewed from the illuminating light source 10 their edges would appear at least to touch,

system is constituted by a pair of sets of bars located respectively at opposite sides of said modulatable medium.

4. Apparatus as defined in claim 1 wherein said bar system is constituted by a single set of bars and which further includes a concave reflector to which said modulatable medium is applied, said reflector forming a focussed image of the bar system on the bar system itself.

5. Apparatus as defined in claim 1 wherein each of said bars includes at least one bevel edge adjacent its reflecting face, said bevel edge being visible only if viewed from said modulatable medium.

6. Apparatus as defined in claim 5 wherein each of said bevel edges has a mirror face.

7. Apparatus as defined in claim 5 wherein the gaps between adjacent bars if viewed from said modulatable medium are narrower than the combined width of the reflecting face and bevel edge of each bar.

8. Apparatus as defined in claim 7 wherein the width of the bevel edge of each bar lies in a range of from one tenth to one fifth of the width of the reflecting face of the bar.

References Cited in the file of this patent

UNITED STATES PATENTS 2,544,938  Heitzel et al. _____ July 7, 1953